Oct. 31, 1961 F. S. TOBEY 3,006,502

DISPENSER FOR PRECUT PRESSURE SENSITIVE TAPE

Filed Nov. 24, 1958 5 Sheets-Sheet 1

INVENTOR
FREDERIC S. TOBEY

BY Roger Sherman Hoar

ATTORNEY

DISPENSER FOR PRECUT PRESSURE SENSITIVE TAPE

Filed Nov. 24, 1958 5 Sheets-Sheet 2

INVENTOR
FREDERIC S. TOBEY

BY Roger Sherman Hoar

ATTORNEY

Oct. 31, 1961 F. S. TOBEY 3,006,502

DISPENSER FOR PRECUT PRESSURE SENSITIVE TAPE

Filed Nov. 24, 1958 5 Sheets-Sheet 3

INVENTOR
FREDERIC S. TOBEY

BY Roger Sherman Hoar

ATTORNEY

DISPENSER FOR PRECUT PRESSURE SENSITIVE TAPE

Filed Nov. 24, 1958 5 Sheets-Sheet 4

INVENTOR
FREDERIC S. TOBEY
BY
Roger Sherman Hoar
ATTORNEY

Oct. 31, 1961 F. S. TOBEY 3,006,502

DISPENSER FOR PRECUT PRESSURE SENSITIVE TAPE

Filed Nov. 24, 1958 5 Sheets-Sheet 5

INVENTOR
FREDERIC S. TOBEY

BY Roger Sherman Hoar

ATTORNEY

United States Patent Office 3,006,502

Patented Oct. 31, 1961

3,006,502

DISPENSER FOR PRECUT PRESSURE SENSITIVE TAPE

Frederic S. Tobey, Sharon, Mass., assignor to W. H. Brady Co., Milwaukee, Wis., a corporation of Wisconsin Filed Nov. 24, 1958, Ser. No. 775,856
10 Claims. (Cl. 221—73)

This invention relates to dispensers for precut tape; and resides more particularly in a machine for dispensing masking tapes and other pressure sensitive adhesive tapes which have been cut into discs, squares, and other shapes, for convenience in use, which pieces have been mounted on a continuous backing strip of lining material, for example paper coated with a release coating, the whole being usually then rolled up in a roll. Such pieces of tape may be either printed or unprinted.

By "pressure sensitive tape" is meant pliant sheet material coated with permanent eucohesive adhesive, requiring no solvent to activate the same.

In the dispensing of such pieces of tape, it is common practice to draw the strip of lining material along a flat surface and then abruptly over a sharp edge of the same, thus dispensing the pieces of tape by causing them to peel off from the strip, by remaining in their original plane, instead of following the liner around the sharp edge.

But two requirements of this method are that the adhesion of the pieces of tape to the liner be slight, and that the tape be of relatively stiff material. Accordingly among the materials which have not been successfully dispensed by this method are: tapes of high adhesion; paper tapes which have been creped to enable them to be applied to uneven contours; and plastic tapes which are so thin and/or so flexible that they easily follow their liner around even a sharp edge.

A number of methods have been tried in an effort to solve the problem of dispensing the more flexible and higher adhesion tapes, precut on a continuous liner.

One method which has been tried, has been to apply heat to the tape and liner just before they reach the edge of the plate, to soften and loosen the adhesive. This has been somewhat helpful, but has involved the complication of supplying the heat, and has not been uniformly successful.

Another method which has been tried, has been to provide a slit down the center of the liner, so that one-half of the liner can be pulled off around the edge of the plate, while the other half continues straight ahead in the same plane with each piece of tape still half on and half projecting from this half of the liner. These projecting pieces of tape may then be plucked off of the half liner one by one. But this method is obviously a makeshift. The pieces of tape are frequently distorted as the first half of the liner strip is pulled away. Furthermore, this method will not work with a cut piece of tape the shape of which is such that any part of the piece has an opportunity to go over the edge with the first half of the liner strip, before the enforced separation at the center slit begins. Still furthermore, this method requires that the pieces of tape be stripped off manually from the second half of the liner, and thus does only half the job.

Still another method which has been suggested, has been to use a center-slitted liner, each half of which is pulled over a sharp edge, these two edges diverging in the direction of motion, at an angle of substantially 135 degrees, the apex being adjacent the slitted center line of the liner. There is a separate pulling device for each half of the liner.

This last described device possesses the best possibilities of solving the problem, but can be greatly improved upon in many ways.

Accordingly the principal object of the present invention is to effect these improvements.

For example, means have been provided for using the same machine to dispense pieces of tape from different widths of liner, without alteration of the machine, and for centering these different widths so as to cooperate with the V, and for placing the roll of liner and tape in a convenient depression on the outside of the machine, and for preventing the liner from gettting caught en route from the roll to the V. It has been found that a V of substantially 90 degrees is superior to 135 degrees, and that rounded edges at the V are superior to sharp edges. It has been found necessary to provide means for automatically increasing the grip of the pulling mechanism if resistance is encountered. It has been found necessary to provide means to prevent pieces of tape, on becoming detached from one-half of the liner, from remaining attached to and following the second half of the liner. It has also been found convenient to reeve the liner, on its way from the roll to the pulling mechanism, through a locking device having three alternative positions: (1) loading position, in which the liner is completely free; (2) intermediate position, in which the liner is locked against motion at the lock, but is free to pass through the pulling mechanism; and (3) operating position, in which the liner is free to pass through the lock, but is gripped by the pulling mechanism, and there is called into play the above-mentioned means for completing the detachment of the tape from the liner.

Other objects and advantages will appear in the description which follows:

In the description, reference is made to the accompanying drawings, forming a part hereof, in which there is shown by way of illustration and not of limitation a certain specific form in which the machine of the present invention may be embodied, and certain possible departures therefrom.

In the drawings:

FIG. 4 is a partial transverse vertical section of the same, seen as though cut along the line 4—4 of FIG. 2.

FIG. 5 is a plan view of the front end of the dispenser, without the tapes and liner.

FIG. 6 is a longitudinal vertical section of the dispenser, seen as though cut along the line 6—6 of FIG. 5, showing the hand lever and associated mechanism in operating position.

FIG. 7 is a partial longitudinal vertical section, seen as in FIG. 6, but with the hand lever, etc., in intermediate position.

FIG. 8 is the same, but with the hand lever, etc., in loading position.

FIG. 9 is a partial longitudinal section, seen as though cut along the line 9—9 of FIG. 5. The hand lever and associated mechanism is shown in full lines in operating position, and in broken lines in intermediate position and in loading position.

FIG. 10 is a plan view, partly in horizontal section, seen as though cut along the line 10—10 of FIG. 6.

FIG. 11 is a vertical transverse section, seen as though cut along the line 11—11 of FIG. 6.

FIG. 12 is an isometric perspective of some mounted tape capable of being dispensed by the present invention.

FIG. 13 is a vertical partial section of one of the diverging edges, seen as though cut along the line 13—13 of FIG. 10.

FIG. 14 is a vertical section of a variant divergent edge, seen as though cut along the same line 13—13 of FIG. 10.

FIG. 15 is a vertical partial section of another variant divergent edge, seen as though cut along the same line 13—13 of FIG. 10.

FIG. 16 is a plan view of still another variant divergent edge.

FIG. 17 is a vertical partial section of the variant of FIG. 16, seen as though cut along the line 17—17 of FIG. 16.

FIG. 18 is a plan view of still another variant divergent edge.

FIG. 19 is a vertical section of the variant of FIG. 18, seen as though cut along the line 19—19 of FIG. 18.

Throughout the description, the same reference number is applied to the same member or to similar members.

Figure 1:
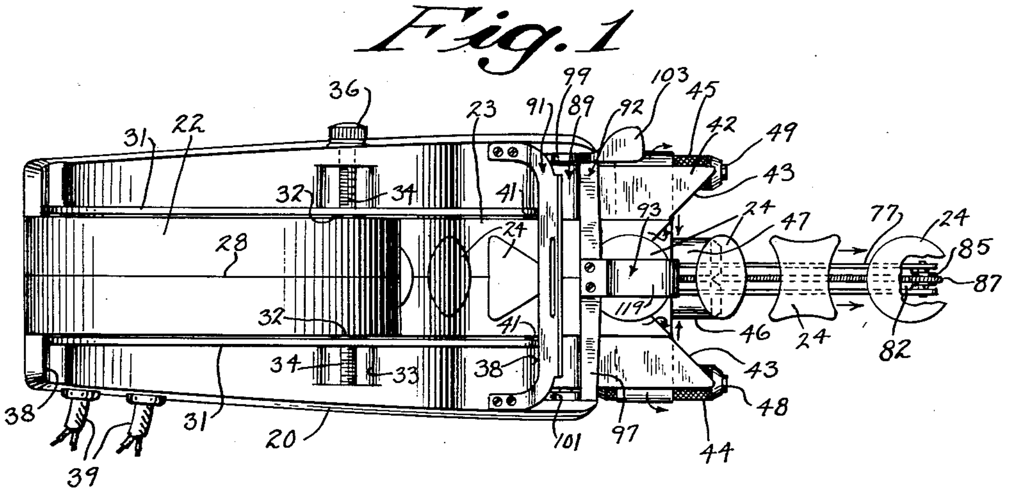
FIG. 1 is a plan view of the preferred embodiment of the dispenser of the present invention, dispensing.
Figure 2:
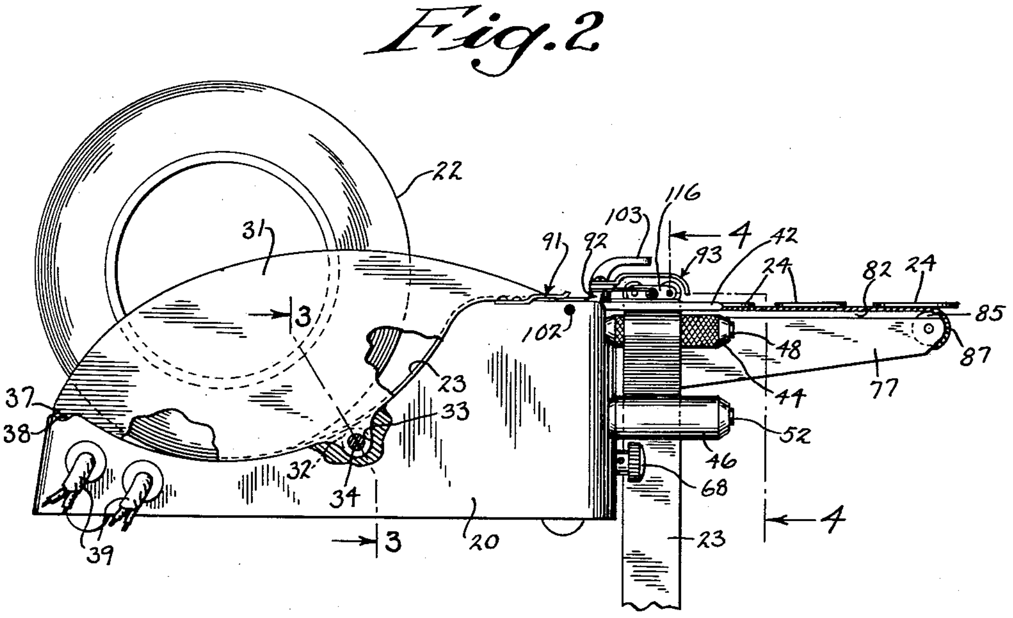
FIG. 2 is a side elevation of the same.
Figure 3:
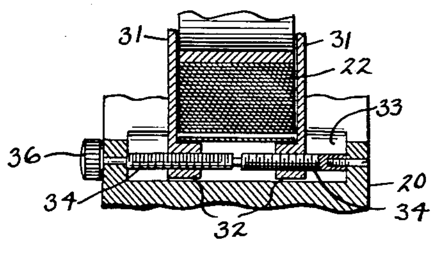
FIG. 3 is a partial transverse nearly vertical section of the same, seen as though cut along the line 3—3 of FIG. 2.
Figures 6, 7, 8, 9:
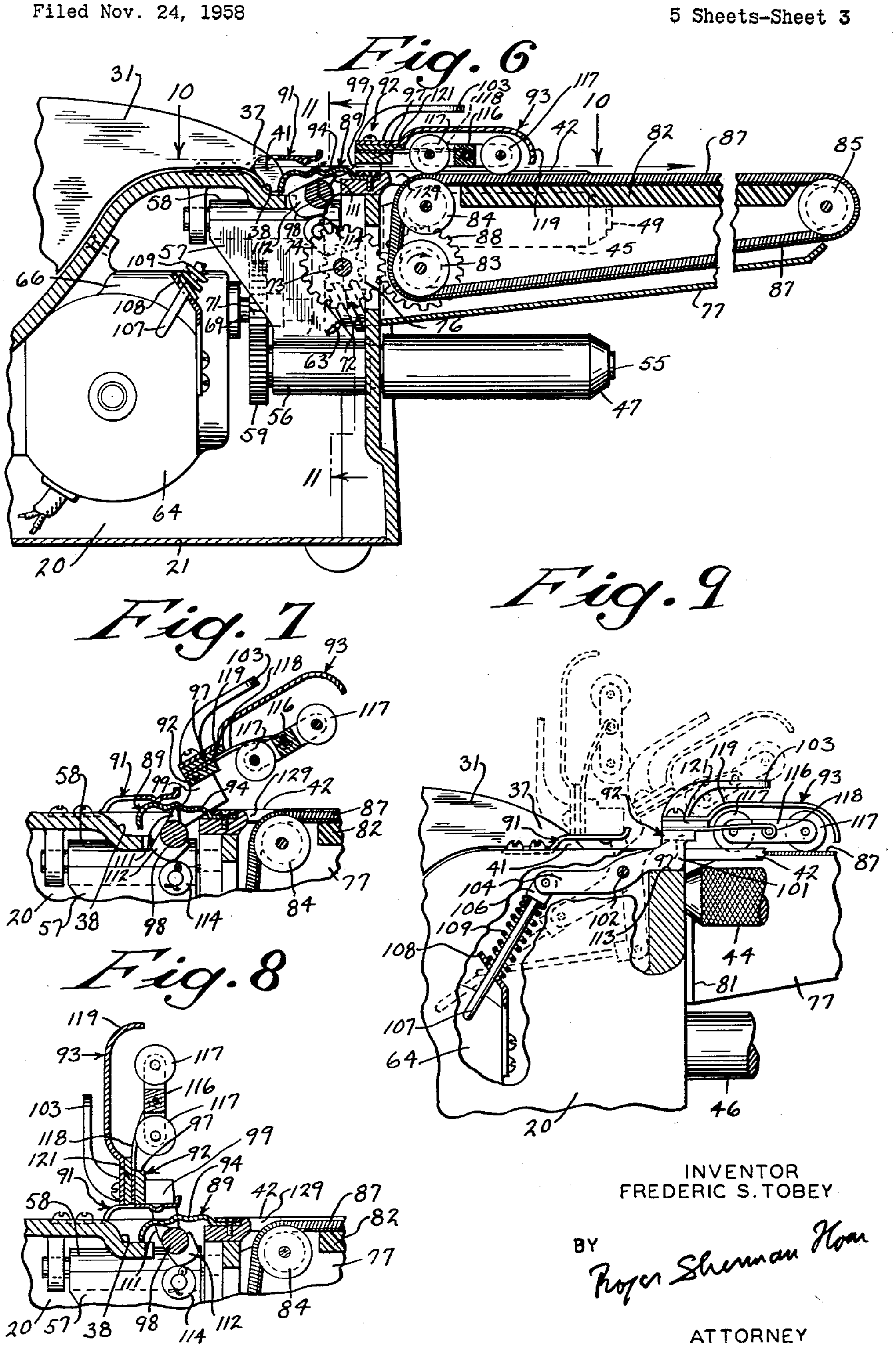

Referring now to the drawings, more particularly at the start to FIGS. 1, 2 and 3, it will be seen that 20 is the main frame of the dispenser. This frame is hollow and open at the bottom, where it may be closed by a plate 21 (FIG. 6). The rear end of the upper surface of the frame 20 constitutes a depression concavely curved longitudinally and straight transversely to accommodate a roll 22 of mounted tape. The front end of frame 20 serves as a housing to contain most of the machinery.

Figure 12:
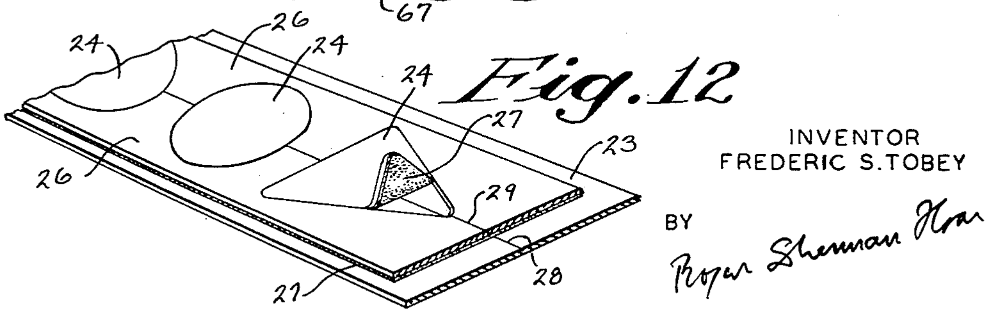

Turning momentarily to FIG. 12, it will be seen that 23 is a continuous backing strip of lining material (herein usually referred to as the "liner" or "web"), on which is mounted a continuous strip of pressure sensitive tape, precut into masks 24 and waste material 26. 27 represents the adhesive. Liner 23 should be cut, or at least deeply scored, down its center as at 28. But whether the liner is precut, or prescored, or cut or scored by some means added to the mechanism is immaterial to the present invention, and is within the meaning of the continuously slitted liner recited in the claims. The waste tape material should be cut down its center as at 29 and/or preferably removed, before the mounted pieces of tape are rolled for sale. All drawings, except FIG. 12, show it removed.

Now revert to FIGS. 1 to 3. Roll guides 31 are a pair of parallel flat vertical fore-and-aft plates which serve to confine roll 22 so that cut 28 in liner 23 lies along the center line of the machine. These guides are adjustable to different widths of roll. Nuts 32 integral with the guides, project into transverse trough 33 in the upper surface of the main frame. These nuts are reversely threaded, as are the two ends of transverse adjusting shaft 34, so that turning adjusting knob 36 (keyed to shaft 34) in one direction will move the two roll guides 31 toward each other, and turning the knob in the other direction will separate the two guides.

At each end of each roll guide 31 there is an extension 37, which fits into a transverse groove 38 in the upper surface of the main frame, and prevents the liner from sliding out laterally under either of the roll guides 31. This lateral sliding out would otherwise be likely to happen: at the rear in the case of a large roll, and at the front with any size roll. For the front extension 37 and cooperating groove 38 see FIG. 6.

Conduits 39 may lead respectively to a source of electric power and a switch, such as a foot-operated switch, for actuating the machine. Inasmuch as the electrical details of this machine form no part of the invention they will be merely mentioned herein.

The inwardly projecting bosses 41 on the forward ends of roll guides 31 provide accurate centering of the web, while allowing a little looseness between the sides of the roll and the roll guides. See FIGS. 5 and 10.

The web, after unwinding from the roll 22, follows the bottom of the depression, up over and along the front end of main frame 20, and through the several elements of a locking mechanism (which will be discussed hereinafter); thence along the flat top of a plate 42, which is secured to the main frame adjacent the forward edge of its top and projects forwardly therefrom, terminating in two edges 43, diverging symmetrically forward to form a V, with its apex at substantially the slit 28 of liner 23. As will appear later herein, plate 42 may be omitted and/or edges 43 may be formed otherwise and supported otherwise than as shown.

The edges 43 should be blunt and should diverge at substantially a 90 degree angle.

The reason for the bluntness is that a sharp edge would be apt to tear the liner, particularly if and where a nick occurred in the liner. In spite of this disadvantage, a sharp edge had to be used to effect separation of the pieces of tape from the liner in the single-edge dispenser of the prior art. It is one of the discoveries of the present invention that the V double edge thereof renders unnecessary the sharp edge of the prior art.

The reason for the 90 degrees is, as will appear hereinafter, that that angle directs the two halves of the liner so that they can be gripped and pulled together.

In the preferred embodiment as shown, each of the two edges 43 of the V is the slightly thickened rounded edge of a thick plate 42. But it might be any equivalent rounded edge, such as the edge of a uniformly thicker plate, or the edge of a thin plate bent down and curved under, or even a small diameter idling roller, or even a rounded edge with no plate at all. On all of which see the description of FIGS. 13 to 19 near the end of this present specification.

Reverting now to the description of the reeving of the liner.

At the V, the liner is separated into its two halves, along its central cut or score, each half passing down and around one of the two blunt edges 43, each half being thereby peeled from the successive pieces of tape 24. Thence each half passes laterally directly away from the other, and around one of idler rollers 44—45. Thence the two halves come together again, but this time face to face, to be gripped together between pull rollers 46—47, as will be explained hereinafter.

Idler rolls 44—45 are preferably of some hard material, and with a scored or knurled surface for the purpose of readily releasing any adhesive material which may have been transferred to and carried along by the liner. The axle 48 or 49 of each idler roller is firmly anchored in the front wall of main frame 20, and in one of brackets 51 which depend from the top of the main frame. See FIGS. 6 and 10.

Figure 11:
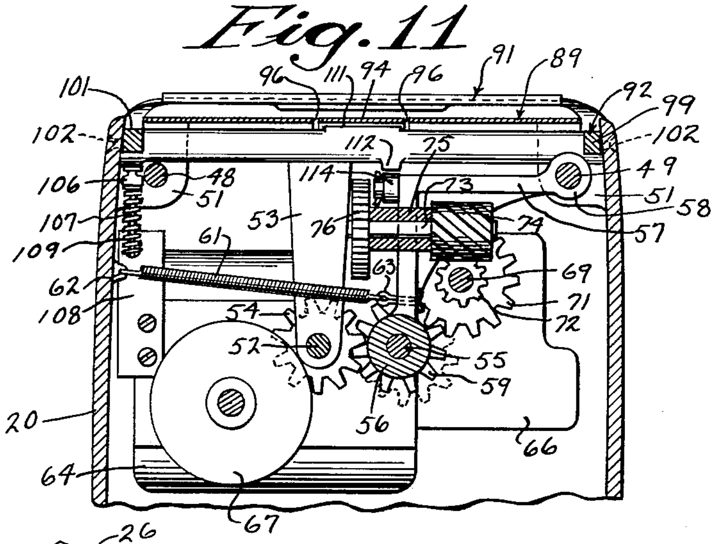

Next see FIGS. 6 and 11. Pull rollers 46 and 47 should be of some resilient substance such as soft rubber, cemented or otherwise securely fastened to their respective shafts. Pull roller 46 is thus secured to shaft 52, which is journaled in the front wall of main frame 20, and in long bracket 53 which depends from the top of the main frame. Also keyed to this shaft 52 is a spur gear 54.

Pull roller 47 is secured to shaft 55, which is journaled in a sleeve 56 of swinging bracket 57. This sleeve projects loosely through a hole in the front of main frame 20. Bracket 57 also includes a pivot sleeve 58 which is journaled around idler axle 49. By reason of this pivot and of the hole through which sleeve 56 loosely projects, bracket 57 is capable of a limited degree of swinging. Also keyed to shaft 55 of pull roller 47, there is a spur gear 59 which meshes with spur gear 54 the other pull roller.

A tension spring 61, which extends between an anchorage 62 on the wall of main frame 20 and an anchorage 63 on swinging bracket 57, lightly biases the two pull rollers 46 and 47 toward each other to grip the two halves of liner 23 between them. To the extent that the liner resists the pull exerted by motor 64 through these two rollers, a part of the motor torque will be transferred from rotating the rollers, to cumulating with said bias, thus swinging 47 toward roller 46 into tighter gripping contact with the liner.

64 is an electric motor. 66 is a gear reduction for the motor. 67 is a rheostat to control the speed of the motor. The rheostat can be manipulated by knob 68.

Output shaft 69 of the motor is journaled in the gear reduction and in the front of main frame 20. It carries keyed thereto spur gear 71 and helical gear 72.

Figure 4:
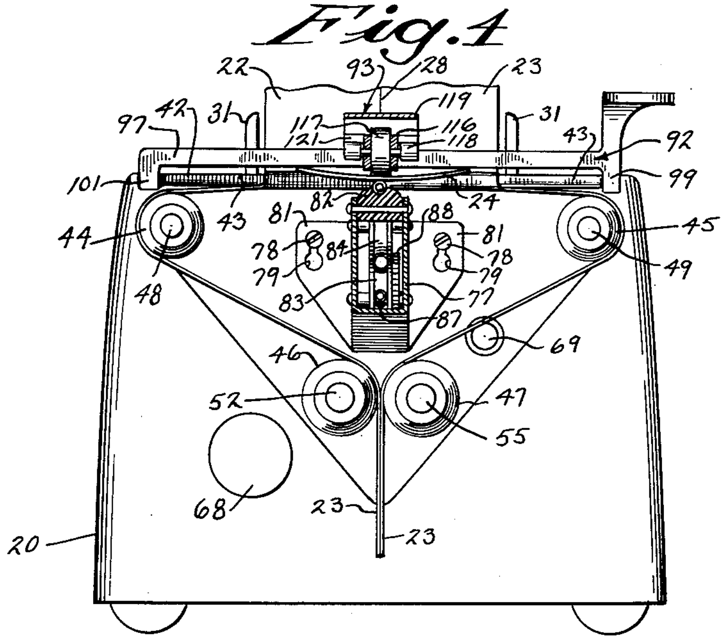
FIGS. 4 to 12 are to a uniform more open scale than FIGS. 1 to 3.

Spur gears 54, 59, and 71 are of sufficiently coarse pitch so that 59 continues to engage 54 and 71, even when the two pull rollers 46 and 47 are spread apart. The direction of rotation is such that, as seen in FIG. 4, pull roller 46 rotates clockwise and pull roller 47 rotates counterclockwise, thus pulling the two half backing strips 23 downwardly when clasped between these two rollers.

It is extremely advisable, if not essential, that the two pull rollers, 46 and 47, be substantially identical in diameter. Experience has shown that, when these rollers are matched to within 0.005 inch in diameter, the liner centers itself between the two edges 43; whereas, if the rollers are much more different than this, the liner will not readily center itself, and may even go off center if the rollers are very much more different.

A transverse shaft 73 is journally supported in a sleeve 75, which is secured to the inside of the front of frame 20. This transverse shaft carries keyed thereto a helical gear 74 and a spur gear 76. Helical gear 74 engages and is driven by helical gear 72. Spur gear 76 protrudes through a slot in the front of frame 20 and serves to drive the conveyor which will now be described. See particularly FIGS. 1, 2, 4, and 5.

Conveyor frame 77 is removably secured to the front of main frame 20 in any convenient manner, such as by screws 78 in slotted holes 79 in laterally extending wings 81 at the rear end of the conveyor frame. The rest of this frame has a square-bottomed U cross section. Between its top edges is a trough 82. Journaled in the conveyor frame are three V-pulleys 83, 84, and 85, around which there is trained a conveyor belt 87, which is preferably a continuous coil spring belt, but could be a V-belt, or even a narrow flat belt or other form. The upper reach of this belt slides in trough 82, the surfaces adjacent the edges of which trough are almost as high as the belt, so that the masks 24 will not tip off to either side while being conveyed forwardly. Rigid with pulley 83 is a spur gear 88 which meshes with spur gear 76.

The chain of gearing which leads from output shaft 69 to the pull rollers 46 and 47, and the chain of gearing which leads from output shaft 69 to the conveyor belt 87 are so proportioned that belt 87 is synchronized with liner 23; so that, as the liner divides and its two halves are pulled laterally away from each other and from the masks 24, the masks will be carried forward one by one, thus becoming completely detached from the two halves of the liner. A pressure wheel assembly 93, which presses the masks into contact with the conveyor at the beginning of their travel on the conveyor, will be described later herein after describing the locking mechanism. The masks can be plucked from the conveyor belt by hand as needed, or readily transferred to an automatic mechanism for applying them.

And now to describe the locking mechanism, which constitutes one of the features of the present invention. This mechanism comprises (see FIG. 1): lower clamping blade 89, upper clamping blade 91, hand lever unit 92, and pressure wheel assembly 93. The two clamping blades should be of spring steel or the like, and the hand lever unit should be of some nonyielding substance such as cast bronze.

Figure 10:
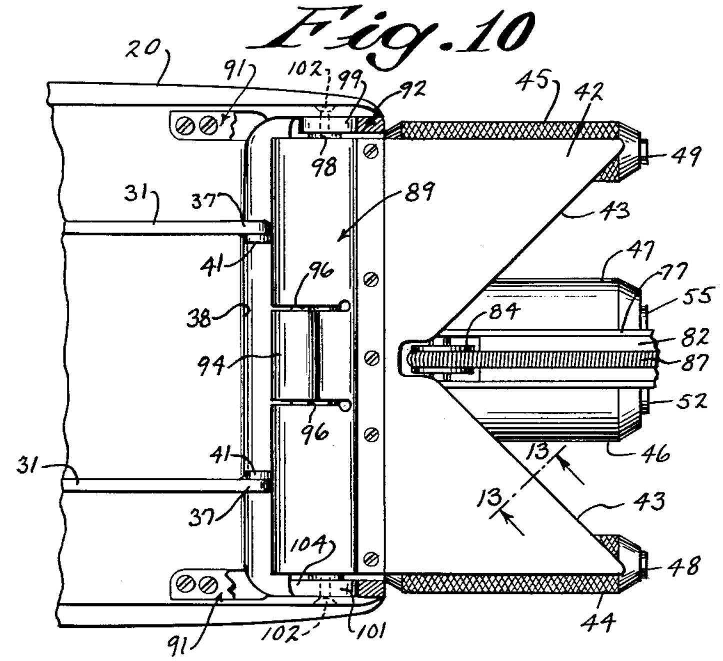

Lower blade 89 is best seen in plan in FIG. 10. In its normal unsprung position while operating, it serves merely as a part of the table over which slides the liner 23. The central portion 94 of this blade is separated from the rest of the blade by two partial cuts 96. This central portion can be raised by one of the cams of the hand lever unit which constitutes the control means, as will be described later herein. The lower blade can be secured to the top of main frame 20 in any convenient manner as by screwing it onto the rear edge of V-plate 43, as shown.

Figure 5:
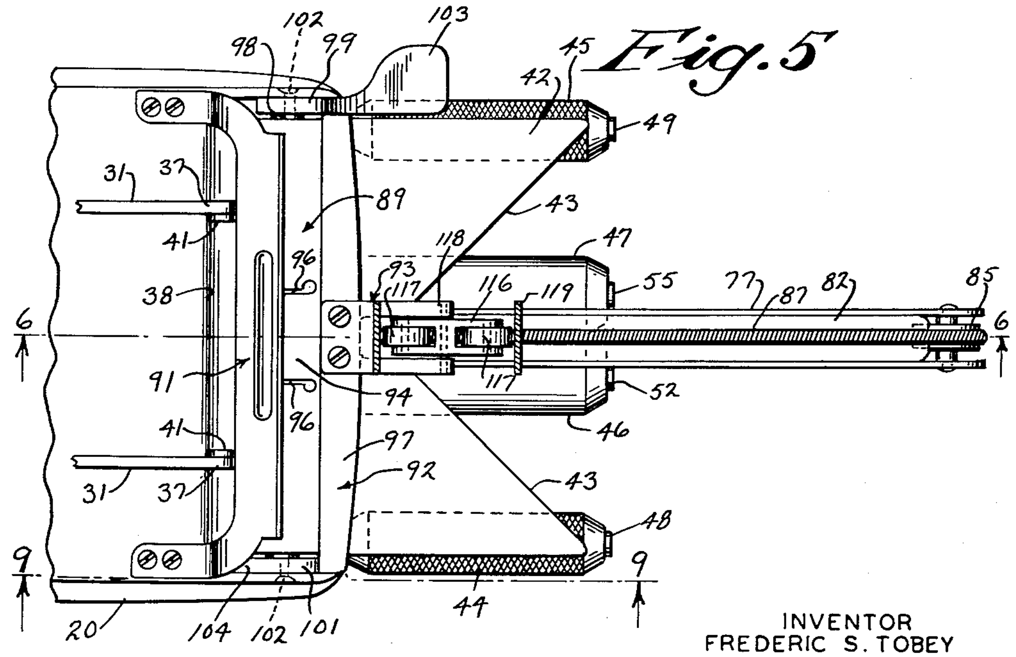

Upper blade 91 is secured at its ends to the top of main frame 20 in any convenient manner, such as by screws as best shown in FIGS. 5 and 10. The central portion of upper blade 91 is elevated, so as to permit liner 23, carrying masks 24, to pass freely beneath it, above central portion 94 of the lower blade when the latter is in its normal operating position as best shown in FIG. 8.

The hand lever unit 92 comprises forward crosspiece 97, rear crosspiece 98, and two connecting pieces 99 and 101, each being at one side of the machine. The whole unit pivots about screws 102, inserted through appropriate holes in the sides of main frame 20 into the ends of rear crosspiece 98. From the left connecting piece 99 there extends upwardly and forwardly a hand lever 103.

From the right connecting piece 101 (see FIG. 9) there extends downwardly and rearwardly a spring-carrying extension 104. Pivoted on the end of this extension is the head 106 of a spring rod 107. This rod passes through a hole in a bracket 108, which is secured to frame 20 in any convenient manner, as by screws attaching it to motor 64. Abutting on head 106 and bracket 108, and surrounding rod 107, there is a spiral compression spring 109.

Centrally located on rear crosspiece 98 are two cams: an upper cam 111, and a lower cam 112. See FIGS. 11, 7, 8, and 9. When the locking mechanism is in its intermediate position (as shown in FIG. 7), upper cam 111 raises central portion 94 of lower clamping blade 89 and catches in the groove of said central portion 94, holding the spring mechanism in toggle (as shown dotted in FIG. 9). At either side of this toggle position, spring 109 tends to swing the locking mechanism to one or the other of its extreme positions (namely operating position and loading position). In operating position (shown in full lines in FIG. 9) the mechanism comes to rest with the front ends of connecting pieces 99 and 101 abutting the top edge of the front wall of main frame 20, as at 113 in FIG. 9. In loading position (shown dotted in FIG. 9) the mechanism comes to rest with extension 104 abutting the inside face of said front wall.

In intermediate position (FIG. 7) and in loading position (FIG. 8) lower cam 112 pushes down on cam follower 114 which is journaled on swinging bracket 57, thus rotating this bracket slightly about its pivot sleeve 58 on axle 49. This spreads spur gear 59 almost into disengagement from spur gear 54. See the dotted showing of gear 59 in FIG. 11. This spreads pull roller 47 away from pull roller 46.

Pressure wheel assembly 93, previously referred to, will now be described in detail, having more particular relation to FIGS. 5, 4, and 8. A small H-shaped frame 116 carries journaled therein two wheels 117, and is itself journaled on the forwardly projecting ends of a bifurcated leaf-spring 118. This leaf-spring and a guard 119, separated by a spacer 121, are secured to and project forwardly from the top of crosspiece 97 of hand lever unit 92. In the operating position of the latter, the wheels press down upon the masks 24, to engage conveyor belt 87 at just the time when the liner 23 is being stripped away by being divided and pulled over the two edges 43 of the V-plate 42. In the intermediate and loading positions of the unit the wheels are lifted clear.

This introduces an additional function for conveyor belt 87, in addition to merely carrying the masks 24 out to where they can conveniently be picked off. If a mask breaks away from one side of the liner before it does from the other side, it would follow the side to which still attached, were it not for the fact that because the mask is firmly pressed against the conveyor belt by wheels 117 under the influence of lead-spring 118, the adhering edge of the mask is pulled by the conveyor belt off of the second side of the liner.

The important part played by hand lever assembly 92 will now be briefly adverted to. Said assembly is normally in its operating position as shown in FIG. 6. To place the assembly in loading position, hand lever 103 is pulled up and back as far as it will go, as shown in FIG. 8. This leaves open the space between the two clamping blades 91 and 94, and opens the space between the two pull rollers 46 and 47. Roll 22 of mounted tape is placed between the two roll guides 31 as shown in FIGS. 1 and 2, and is centered by manipulating these two guides as explained earlier herein. Sufficient masks are removed to provide sufficient free length of split liner.

This liner is then threaded between the two clamping blades 91 and 94, and thence over edges 43 of the V, where it is divided and half is trained around idler roller 44, and the other half around idler roller 45. Thence the two halves are brought together face to face, and are threaded together between the two pull rollers 46 and 47.

Hand lever 103 is then moved to its intermediate position as shown in FIG. 7, thus clamping the liner between the two clamping blades 91 and 94, but leaving the liner still loose between the two pull rollers 46 and 47. As the lever mechanism is now locked in that position, the operator is free to use both hands to pull the two halves of the liner tightly down between the pull rollers so that both halves of the liner are equally tensioned and the split in the liner is centered on the V.

Then, holding the two halves of the liner together in one hand, the operator uses the other hand to snap lever 103 forward into the operative position of FIGS. 6 and 9, thus clamping the liner between the pull rollers, and unclamping the liner at the clamping blades. At the same time wheels 117 are pressed against conveyor belt 87. The machine is now ready to operate, with the web very neatly and positively in place, perfectly centered. It is distinctly advantageous to have the web perfectly centered before operating the machine; for, although it would gradually center itself if started off center, it would be under uneven strains while centering, and might meanwhile split or tear, especially if weak at any point.

As already stated earlier herein, it is one of the discoveries of the present invention that the edges of the V should be rounded, rather than sharp. Although it was necessary to make the transverse single edges of the prior art sharp and abrupt in order to effect severance of the masks from the liner, this was at the cost of danger of tearing the liner as it passes over the edge, which danger appears to be even greater in the case of a V edge. An edge with a radius of 5 mils or less can be definitely considered as sharp. A sharp edge is unnecessary in the case of the V of the present invention, and thus in the present invention the edge can be bluntly rounded and avoid the danger of tearing.

It has been found, for example that, for a dispenser capable of handling liners up to four and a half inches in width, an edge with a radius of curvature of one-eighth of an inch is ideal. A radius of curvature so short that the sharpness of the edge would be sufficient to tear the liner for which the particular machine is designed, would be inadvisably short. Whereas a radius of curvature so long that the edge would have to project beyond the sides of the machine in order to accommodate the widest liner which the rest of the machine will accommodate, would be inadvisably long.

Figure 13:
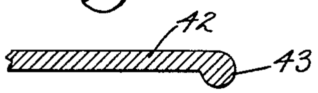
FIGS. 13 to 19 are to a uniform still more open scale than FIGS. 4 to 12.

The rounded edge can take a number of alternative forms, some of which will now be adverted to. Thus, in the preferred embodiment (see FIGS. 10 and 13) the rounded edge 43 is part of a flat guide plate 42, and for the purpose of not rendering this plate too bulky the rest of the plate is thinner than the edge. FIG. 13 is a vertical partial section of one of the edges 43, seen as though cut along the line 13—13 of FIG. 10.

Figure 14:
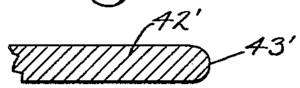

FIG. 14 is similar, seen as though cut along the same line, except that here the plate 42′ is as thick as its edge 43′.

Figure 15:
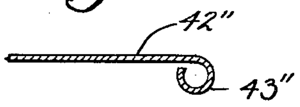

FIG. 15 is similar, seen as though cut along the same line, except that here the plate 42″ is very thin, and each edge 43″ is formed by curling each edge of the V over to form a large rounded surface.

Figure 16:
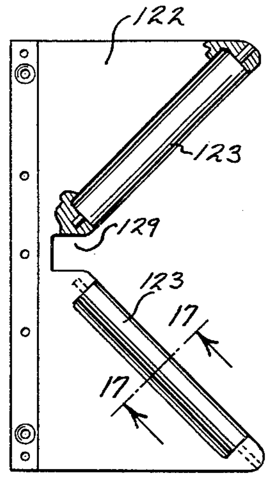
Figure 17:
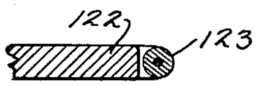

FIG. 16 shows a further variant, in which each V-edge takes the form of a roller 123 journaled in plate 122. FIG. 17 is a vertical partial section, seen as though cut along the line 17—17 of FIG. 16.

Figure 18:
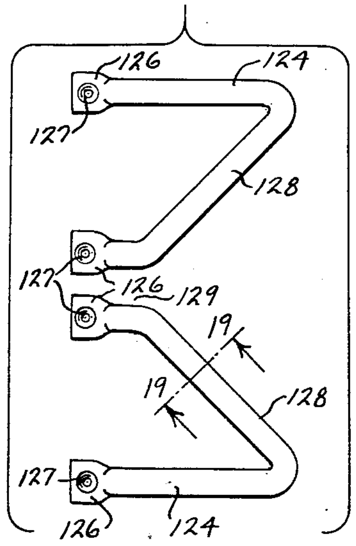
Figure 19:
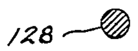

FIG. 18 shows a still further variant. In place of plate 42, there are two heavy wires of circular cross section, wrought into the form shown, the ends 126 of each being flattened and bored (as at 127) for securing to the upper front edge of main frame 20 by screws or the like. Reaches 128 constitute the V-edges of this variant. FIG. 19 is a vertical section, seen as though cut along the line 19—19 of FIG. 18.

In the preferred embodiment, and in each of the four variants, it will be noted that the two rounded edges of the V do not come together in an apex. Instead there is an appreciable gap 129. In the absence of such a gap: of for any reason, the liner were initially, or were to become, even slightly uncentered, this would cause one of the halves of the liner to span the apex and rub against the opposite edge of the V, thus running the danger of roughing-up the edge of the half-liner and even starting a tear.

Another function of this gap 129 is for the conveyor belt 87 and its pulley 84 to protrude through, thus enabling each mask 24 to be seized between belt 87 and wheels 117 at an earlier stage of its separation from liner 23 than otherwise, an action which is particularly important in the case of very small masks.

From the foregoing description of the invention it will readily be evident that the invention constitutes a new and useful dispenser for precut pressure sensitive tape, which dispenser contains many novel features.

Now that one embodiment of the invention has been shown and described, and several variations therefrom have been suggested, it is to be understood that the invention is not to be limited to the specific forms or arrangements of parts herein shown and described.

What is claimed is:

1. A dispenser for precut pieces of pressure sensitive tape, which tape is removably mounted on a strip of liner which has a continuous slit down the center centered on the pieces of tape, the whole being rolled up into a roll, which dispenser comprises: a main frame; means for supporting the roll on said frame for convenient unwinding; means supported on said frame for pulling on the liner to unwind the roll; means supported on said frame for guiding the liner from the roll to the pulling means, said guiding means including, as tape removing means, two edges diverging symmetrically forward with respect to the line of travel of the center of the liner, over which edges the liner is drawn to split it along its slit and peel it from the pieces of tape in two divergent halves; and means for actuating the pulling means; said dispenser being characterized by the fact that the means for supporting the roll comprises: a concave depression on the main frame, said depression being curved longitudinally and straight transversely to accommodate the roll; a pair of roll guides, each comprising a flat longitudinal plate slidable transversely in the depression in close contact therewith; and means for simultaneously and at the same rate moving these guides toward or away from each other at will, whereby the depression may accommodate, between these guides, rolls of different widths and maintain each roll centered with respect to the tape-removing means.

2. A dispenser according to claim 1, wherein there is, at least one end of the depression, a transverse groove; and each guide has, at its adjacent end a projection fitting into this groove and slidable transversely.

3. A dispenser according to claim 1, wherein each guide has, adjacent the downward edge of its forward end, a boss projecting toward the other guide, whereby the guides will accurately center the liner at that point, while allowing a little looseness between the guides and the sides of the roll.

4. A dispenser for precut pieces of pressure sensitive tape, which tape is removably mounted on a strip of liner which has a continuous slit down the center centered on the pieces of tape, the whole being rolled up into a roll, which dispenser comprises: a main frame; means for supporting the roll on said frame for convenient unwinding; means supported on said frame for pulling on the liner to unwind the roll; means supported on said frame for guiding the liner from the roll to the pulling means, said guiding means including, as tape-removing means, two edges diverging symmetrically forward with respect to the line of travel of the center of the liner, over which edges the liner is drawn to split it along its slit and peel it from the pieces of tape in two divergent halves; and means for actuating the pulling means; said dispenser being characterized by the fact that there is a substantial gap between the adjacent ends of the two edges of the tape removing means and a conveyor belt extending from within the gap, forwardly along a course forming a continuation of the path of the liner as the latter approaches the two edges; means for propelling the belt, which means is synchronized with the means for pulling the liner; and means for pressing the pieces of tape firmly against the belt adjacent the gap.

5. A dispenser according to claim 4, wherein there is a trough in which the belt slides, the surfaces adjacent the edges of this trough being almost as high as the belt, so that the pieces of tape will not tip off on either side while being conveyed forwardly.

6. A dispenser for precut pieces of pressure sensitive tape, which tape is removably mounted on a strip of liner which has a continuous slit down the center centered on the pieces of tape, the whole being rolled up into a roll, which dispenser comprises: a main frame, means for supporting the roll on said frame for convenient unwinding; means supported on said frame for pulling on the liner to unwind the roll; means supported on said frame for guiding the liner from the roll to the pulling means, said guiding means including, as tape removing means, two edges diverging symmetrically forward with respect to the line of travel of the center of the liner, over which edges the liner is drawn to split it along its slit and peel it from the pieces of tape in two divergent halves; and means for actuating the pulling means; said dispenser being characterized by the fact that the guiding means includes two widely spaced idler rollers the axes of which are parallel to the path of the liner as the latter approaches the two edges, and around each of which rollers one-half of the liner passes after leaving its respective one of the two edges, said dispenser being further characterized by the fact that the pulling means comprises two rotating contacting pull rollers, gripped between which rollers the two halves of the liner pass face to face after leaving the idler rollers.

7. A dispenser according to claim 6 wherein the first of the pull rollers is fixedly pivoted on the main frame and the second is pivoted on a swinging bracket, the pivot of said bracket being located in a position whereby resistance to pull on the liner will swing the second roller closer to the first roller; and means for imparting an initial bias of the second roller toward the first.

8. A dispenser according to claim 7, including locking mechanism, which mechanism comprises: clamping means through which the liner passes on its way from the roll to the tape removing means; means for closing the clamping means; means for swinging the second pull roller away from the first pull roller; and control means, having three selective alternative positions of rest, namely; (1) loading position, in which the clamping means is open and the two pull rollers are separated; (2) intermediate position, in which the clamping means is closed and the two pull rollers are still separated; and (3) operating position, in which the clamping means is open and the two pull rollers are together.

9. A dispenser according to claim 8, wherein: the control means includes a crosspiece pivoted for limited rotation; the clamping means comprises two resilient blades, normally spaced for the liner to pass therebetween; the means for closing the clamping means comprises a cam rotatable with the crosspiece, and bearing on one of the blades to force it toward the other in intermediate position; and the means for swinging the second pull roller away from the first pull roller comprises a cam follower on the swinging bracket, and a cam rotatable with the crosspiece and bearing on the cam follower in loading and intermediate positions.

10. A dispenser according to claim 9, wherein there is a conveyor belt extending from the two edges forwardly in extension of the line of travel of the center of the liner, and wherein there is at least one wheel, spring mounted on the control means in such manner that in operating position it will press the pieces of tape against the conveyor belt as the liner is being peeled from the tape in two divergent halves.

References Cited in the file of this patent

UNITED STATES PATENTS

| | | |
|---|---|---|
| 906,295 | Rose | Dec. 8, 1908 |
| 2,208,994 | Mabon | July 23, 1940 |
| 2,276,297 | Flood | Mar. 17, 1942 |
| 2,289,642 | Flood | July 14, 1942 |
| 2,331,019 | Flood | Oct. 5, 1943 |
| 2,484,880 | Flood | Oct. 18, 1949 |
| 2,522,224 | Hedinger | Sept. 12, 1950 |
| 2,602,719 | Thiene et al. | July 8, 1952 |
| 2,765,205 | Capella et al. | Oct. 2, 1956 |
| 2,933,216 | Cole | Apr. 19, 1960 |

UNITED STATES PATENT OFFICE

CERTIFICATE OF CORRECTION

Patent No. 3,006,502 October 31, 1961

Frederic S. Tobey

It is hereby certified that error appears in the above numbered patent requiring correction and that the said Letters Patent should read as corrected below.

Column 4, line 46, for "rolls" read -- rollers --; line 69, after "54" insert -- of --; column 8, line 28, for "of" read -- if --.

Signed and sealed this 1st day of May 1962.

(SEAL)
Attest:

ERNEST W. SWIDER
Attesting Officer

DAVID L. LADD
Commissioner of Patents